United States Patent
Watanabe et al.

[11] Patent Number: 5,845,053
[45] Date of Patent: Dec. 1, 1998

[54] METHOD FOR TEACHING WELDING TORCH ORIENTATION

[75] Inventors: Atsushi Watanabe; Takayuki Ito; Tatsuo Karakama, all of Oshino-mura, Japan

[73] Assignee: Fanuc Ltd., Yamanashi, Japan

[21] Appl. No.: 548,146

[22] Filed: Oct. 25, 1995

[30] Foreign Application Priority Data

Oct. 25, 1994 [JP] Japan .................................. 6-283969

[51] Int. Cl.$^6$ .................................................. G06F 15/18
[52] U.S. Cl. .................... 395/97; 219/124.33; 219/125.1
[58] Field of Search ................. 395/97, 82, 86, 395/88, 85, 93, 98, 83; 364/167; 219/125.12, 124.34, 130.01, 124.33, 125.1, 125.11; 348/95

[56] References Cited

U.S. PATENT DOCUMENTS

| | | | |
|---|---|---|---|
| 4,258,425 | 3/1981 | Ramsey et al. | 395/83 |
| 4,417,127 | 11/1983 | Nachev et al. | 219/124.34 |
| 4,547,800 | 10/1985 | Masaki | 348/95 |
| 4,568,816 | 2/1986 | Casler, Jr. | 219/124.34 |
| 4,642,752 | 2/1987 | Debarbieri et al. | 364/474.02 |
| 4,823,279 | 4/1989 | Perzley et al. | 395/86 |
| 4,887,222 | 12/1989 | Miyake et al. | 395/98 |
| 5,053,976 | 10/1991 | Nose et al. | 395/86 |
| 5,063,281 | 11/1991 | Mizuno et al. | 219/125.12 |
| 5,276,777 | 1/1994 | Hara | 395/87 |
| 5,465,037 | 11/1995 | Huissoon et al. | 318/568.11 |
| 5,510,596 | 4/1996 | Xu et al. | 219/130.01 |

OTHER PUBLICATIONS

Kreft et al., Arc welding seam tracking system based on artificial neural networks, Second int'l conference on intelligent systems Engineering, pp. 177–182, Sep. 9, 1994.
Cook et al., Weld modeling and control using artificial neural networks, IAS 93, pp. 2181–2189, Oct. 8, 1993.

*Primary Examiner*—Allen R. MacDonald
*Assistant Examiner*—Sanjiu Shah
*Attorney, Agent, or Firm*—Staas & Halsey

[57] ABSTRACT

First, an operator sequentially teaches the start point A, the end point F and junction points B, C, D, E on the welding path by moving the torch head by jog feed without paying attention to the torch orientation. Next, a reference plane to define the orientation of the torch is specified, and an inclination angle and a forward angle representing the torch orientation be inputted into a robot controller. On the basis of these inputted angle data and the taught data, a basic welding orientation is automatically calculated. Further auxiliary points are set around the junction points B through E each forming corner parts connecting straight lines; tool vectors which may give a smooth torch orientation change through the corner parts are automatically calculated for the auxiliary points and the junction points; and on the basis of the results, a welding program is produced. Among elements which determine the torch orientation, an element relating to the rotation around the torch axis reflects the state at the time of teaching of points A to E.

7 Claims, 8 Drawing Sheets

A-B-C : WELDING PATH
β : REFERENCE PATH
θ : INCLINATION ANGLE
φ : FORWARD ANGLE

θ : INCLINATION ANGLE
φ : FORWARD ANGLE

β : REFERENCE PLANE
⟨n⟩ : NORMAL VECTOR OF REFERENCE PLANE
A-B : WELDING PLANE

```
UTILITY/TORCH ORIENTATION/TRANSFORMATION/////////AXIS////50%/
PROGRAM                                    PAGE 1/4     5/7

1  TRANSFORMATION SOURCE PROGRAM:    [TEST]
    2      SCOPE:                                         PART
    3      START ROW:                                       34
    4      END ROW:                                         38
    5  PRODUCED/REPLACED:                            /REPLACED/
    6  PROGRAM DESTINED TO BE TRANSFORMED: (UNUSED) [* * * * * *]
    7      INSERTION ROW:           (UNUSED)         * * * * *

PAGE IS CHANGED BY SHIFT + DOWN,SHIFT + UP
  [SCREEN]                                              >
```

FIG. 6

```
UTILITY/TORCH ORIENTATION/TRANSFORMATION/////////AXIS////50%/
DIRECT INPUTTING TORCH ORIENTATION         PAGE 3/4     2/6

1  REFERENCE PLANE TEACHING:             YES
    2          P1:                      /TEACHING EXECUTED /
    3          P2:                       TEACHING EXECUTED
    4          P3:                       TEACHING EXECUTED
    5  INCLINATED ANGLE:                       . 00 deg
    6  FORWARD ANGLE:                          . 00 deg PAGE IS CHANGED BY SHIFT + DOWN,SHIFT + UP
  [SCREEN]    TRANSFORMATION REFER TO POSITION STORE POSITION>
```

FIG. 7

UTILITY/TORCH ORIENTATION/TRANSFORMATION/////////AXIS////50%/
POSITION INSERTION                           PAGE 4/4      2/6

1 NO. OF POSITIONS :                               /2/
  2 PITCH LENGTH :                                   3.00mm

PAGE IS CHANGED BY SHIFT + DOWN,SHIFT + UP
  [SCREEN]    EXECUTION                                   >

FIG. 8

METHOD FOR TEACHING WELDING TORCH ORIENTATION

BACKGROUND OF THE INVENTION

1. Field of the Invention

The present invention relates to a method for teaching a robot capable of implementing a proper torch orientation in performing welding work by play back operation of the robot supporting a torch for arc welding.

2. Description of the Related Art

Where a welding work is performed by play back operation of a robot supporting a welding torch (hereinafter referred to as torch), the orientation of the torch, as well as the position (three dimensional position) of its head, must be properly maintained during the movement of the robot. If the torch orientation is improper, a required welding work can not be accomplished even when the torch head moves on a welding path to trace properly a weld line. Especially, for a weld line path having a large curvature such as corner portion, teaching requiring the torch to sharply change its orientation should be avoided.

FIG. 1 schematically illustrates a conventional method of teaching the position and orientation of a torch to a robot, which is generally utilized. In FIG. 1, a path A→B→C→D→E→F is a welding path along a weld line, in which reference numeral 1 designates a torch mounted on a robot arm (not shown); and reference numeral 2 designates a tool center point set to the head of the torch 1. The tool center point 2 is set with a tool coordinate system of three rectangular X Y Z axes; the origin of the coordinate system is the tool center point 2, and one axis (Z axis) is coincident with the axial center of the torch 1. Thus, it is hereinafter defined that "torch position" refers to the position of the tool center point 2, that is, the origin of the coordinate system, and that "torch orientation" refers to the orientation of the coordinate system. Among many torches shown in FIG. 1, only the torch positioned at a start point A of the welding path is affixed by the reference numerals.

Now, with reference to FIG. 1, a conventional teaching procedure will be explained below.

(1) The robot is advanced by jog feed until the torch position (tool center point 2) coincides with the start point A of the welding path, and then the position of the start point A is taught to the robot. At this time, as torch orientation, an optimum welding orientation (the one shown as a) of the welding path starting from the start point A is taught.

(2) Without changing the taught orientation, the robot is moved along the welding path until the torch position coincides with a position PB located a little before a point B (path junction point B) at which the welding path is bent; and then the position PB is taught. As torch orientation, the orientation a having been taught at the point A is taught as it is.

(3) The robot is advanced further from the position PB until the torch position coincides with the path junction point B, and then the path junction point B is taught. As torch orientation, an intermediate orientation b' between an optimum orientation (given as b), as a welding orientation of the welding path starting from the start point B, and the orientation a having been taught at the start point A or the position PB is taught.

(4) The robot is advanced further from the point B until the torch position coincides with the position QB located a little beyond the path junction point B, and then the position QB is taught. As the torch orientation, the optimum orientation b as the welding orientation of the welding path starting with the start point B is taught.

(5) Thereafter, the same operations are repeated to teach the positions of points PC, C, QC, PD, D, QD, PE, E, QE, and an end point F, and in addition, as the torch orientation, the orientations b, c', c, c, d', d, d, e', e, e at these points are taught.

The meanings of these codes are as follows:

c: Optimum torch orientation at path CD
d: Optimum torch orientation at path DE
e: Optimum torch orientation at path EF
c': Intermediate orientation between orientations c and d
d': Intermediate orientation between orientations d and e However, in the above-mentioned conventional teaching method, and the end point F, the position and orientation of the points PB, QB, PC, QC . . . positioned near before and behind the junction points B, C . . . must be taught as well as the start point A, the junction points B, C . . . , so that there is a disadvantage that the teaching work load becomes large. Particularly, it requires a high skill and a long period of time to perform correctly teaching of the torch orientation affecting welding accuracy.

Particularly, the torch orientation at the point at which the welding path is bent, that is, the path junction points B, C . . . must be taught in such a manner that the change in the torch orientation must be smoothly performed in a small section ranging from before to behind these junction points. However, any simple and objective method for finding out such orientation is not available, thereby relying on the intuition and experience of an operator. Therefore, it is difficult to obtain a stable welding accuracy which is not influenced by the skillfulness of an operator.

OBJECTS AND SUMMARY OF THE INVENTION

An object of the present invention is to provide a method of teaching a robot capable of implementing a proper torch orientation in performing welding work by play back operation of the robot supporting a torch for arc welding, with a less work load.

The teaching according to the present invention follows substantially the following procedure:

(1) While advancing a robot by jog feed, the position of the start point and end point on a weld line defining a section, and of the junction points between these points are taught. However, instead of this teaching, there may be used either the position data of already prepared program or the position data prepared off line.

(2) A required torch welding orientation for respective sections is set on the basis of a reference plane.

(3) On the basis of both the position data of the junction points thus taught and the torch orientation set with respect to the sections starting from the junction points, a basic welding orientation for each section is calculated.

(4) One or a plurality of auxiliary points are set on the respective weld lines before and behind each junction point. Among these auxiliary points, for the most behind auxiliary point, the basic welding orientation for the section just before the present junction point is set, while for the most front auxiliary point, the basic welding orientation for the section starting from the present junction point is set. Further, the intermediate auxiliary points and junction points, with most behind and most front auxiliary points excluded, are given intermediate orientations between the basic welding orientations, which are different from each other according to the arrangement order. The torch orientation is set so as to be changed smoothly near the junction points.

Using the method of the present invention, it is possible to produce automatically a program for realizing a desired torch orientation, by deliberately teaching only the position of the start point, the end point and junction points which divide the intermediate weld line into a plurality of sections, without paying a particular attention to the welding torch orientation. Further, in calculating the welding orientation, it is also possible to reflect the orientation around the torch axis which was taught at the beginning.

BRIEF DESCRIPTION OF THE DRAWINGS

The foregoing and other objects and feature of the invention will become apparent from the following description of preferred embodiments of the invention with respect to the accompanying drawings, in which:

FIG. 6 is a view illustrating an example of an operation screen for a torch orientation quick teach function;

FIG. 7 is a view illustrating an example of an automatic welding orientation calculating screen;

FIG. 8 is a view illustrating an execution screen for automatic calculation for smooth orientation change;

DETAILED DESCRIPTION OF THE PREFERRED EMBODIMENTS

Figure 9:
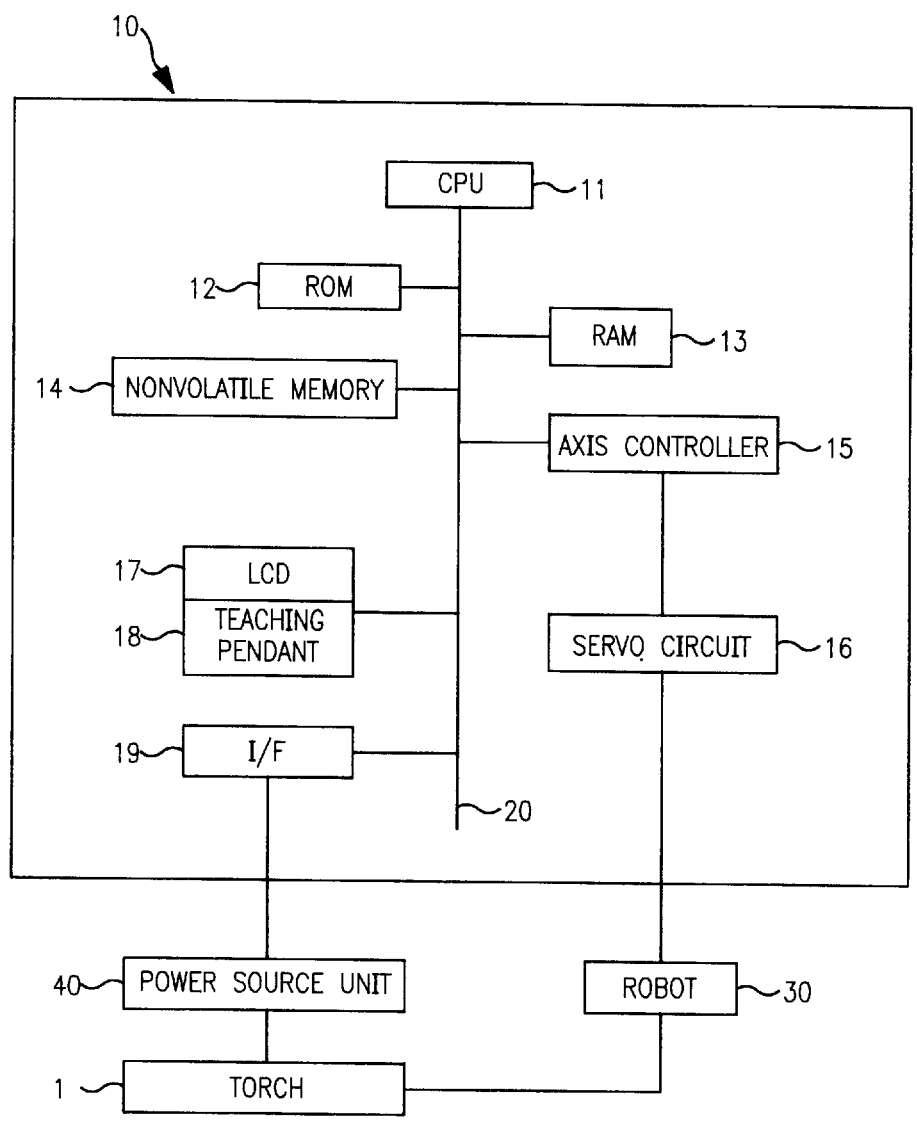
FIG. 9 illustrates, in the form of a major-part block diagram, the outline of the configuration of a welding robot system used in the present invention.

With reference to FIG. 9, the outline of the configuration of a robot system used in this embodiment will be explained. A central processing unit (hereinafter referred to as CPU) 11 in a robot controller 10 for controlling a welding robot is connected through a bus 20 with a memory 12 formed of a ROM, a memory 13 formed of a RAM, a nonvolatile memory 14, an axis controller 15, a teaching pendant 18 including a liquid crystal display (LCD) 17 and a general purpose interface 19.

The axis control part 15 is connected through a servo circuit 16 to a robot (body mechanism unit) 30. Also, the general purpose interface 19 is connected to a power source unit 40. The power source unit 40 has a function of controlling a welding voltage and welding current to be supplied to the torch 1 according to the instruction from the CPU 11.

The ROM 12 is stored with various programs by which the CPU 11 controls the robot (body mechanism unit) 30, the power source unit 40 and the robot controller 10 itself.

The RAM 13 is a memory utilized for the temporary storage and calculation of data. Also, the nonvolatile memory 14 is stored with various programs and parameter set values for specifying the content of the motion of the welding robot system. Programs and associated settings to cause the CPU 11 to execute various processing (whose contents will be described later) for embodying the present invention are divided into the ROM 12 and the nonvolatile memory 14 for storage.

Figure 1:
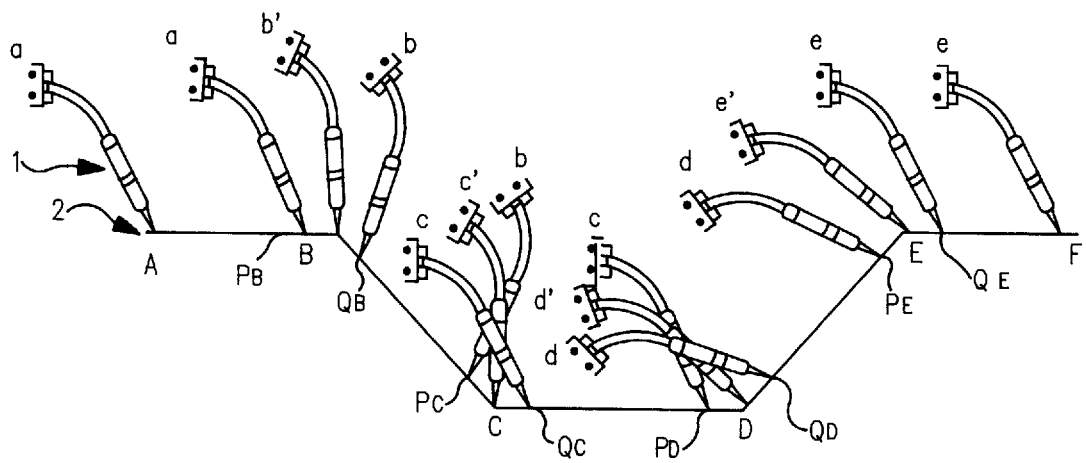
FIG. 1 is a view for explaining a conventional method for teaching the position and orientation of a torch with respect to a robot, which is most generally used heretofore.

A procedure for performing the teaching according to the present invention using the above-described welding robot system will be explained hereinafter, Teaching method of the present invention is accomplished by performing the following three steps, that is, step (1), step (2) and step (3). The three steps correspond to FIGS. 2A, 2B, and 2C. The weld line A–F and the torch 1 in FIG. 2 are the same as those shown in FIG. 1.

1. [Step (1)]

At this step, the position data of respective points including the start point A, end point F, and intermediate path junction points B, C, . . . E on the welding path is obtained.

Figure 2A:
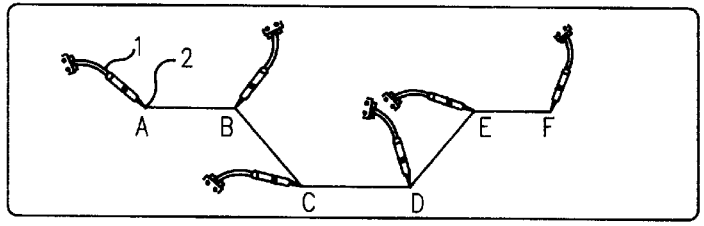
FIGS. 2A–2C are views showing sequentially a procedure for performing a method according to the present invention.
Figure 2B:
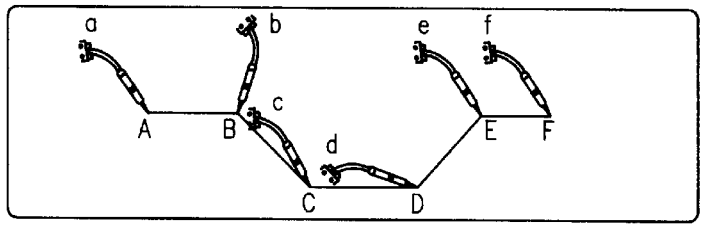
Figure 2C:
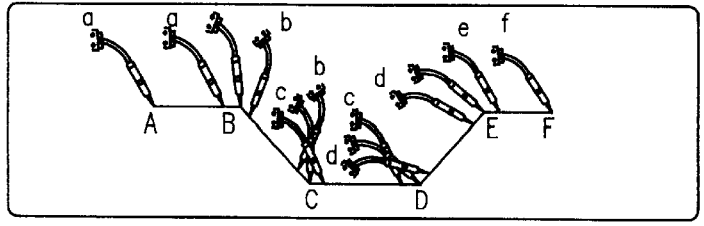

This work is accomplished, as shown in FIG. 2A, by advancing the robot by jog feed to cause the respective torch positions (tool center point 2) to be coincident with the start point A, end point F, and intermediate path junction points B, C, . . . E on the welding path, and then teaching the position of the respective points to the robot. At that time, although the torch orientation is to be also simultaneously taught, the torch orientation is not considered at this step.

At this step, instead the above-mentioned teaching, either the position data of already prepared program relating to the respective points A through F or the position data (orientation data is not necessary) prepared off line may be transferred to the robot controller 10.

2. [Step (2)]

At this step, the welding orientation (hereinafter referred to as basic orientation) which is believed to be optimum for each of the sections AB, BC, . . . EF is automatically calculated.

First, a reference plane for defining the torch orientation is specified, and then an angle parameter representing the orientation is inputted into the robot controller 10. Then, on the basis of the inputted angle parameter and the position date taught at the above-mentioned step(l), the welding orientation (basic orientation) which is believed to be optimum for each of the sections is determined by the software processing of automatic calculation, and the calculated results is stored in the nonvolatile memory 14. This causes the program including the position data obtained by the teaching at step (1) to be transformed into a program teaching the torch orientation as shown in FIG. 2B.

In FIG. 2B, the orientation a calculated for the start point A is a torch orientation which is believed to be optimum for the welding in the section AB; the orientation b calculated for the start point B is a torch orientation which is believed to be optimum for the welding in the section BC; and hereafter in the same manner, the orientation e calculated for the start point E is a torch orientation which is believed to be optimum for the welding in the section EF. These orientations a, b . . . e represent basic orientations in the respective sections. The basic orientation e at the end point F is the same as the basic orientation e in the section E–F including the end point F.

The parameters to be inputted to calculate the basic orientation and a method for calculating the basic orientation will be explained hereinafter. First, with reference to FIG. 3, the reference plane and the angle parameters (inclination angle and forward angle) will be explained.

Figure 3:
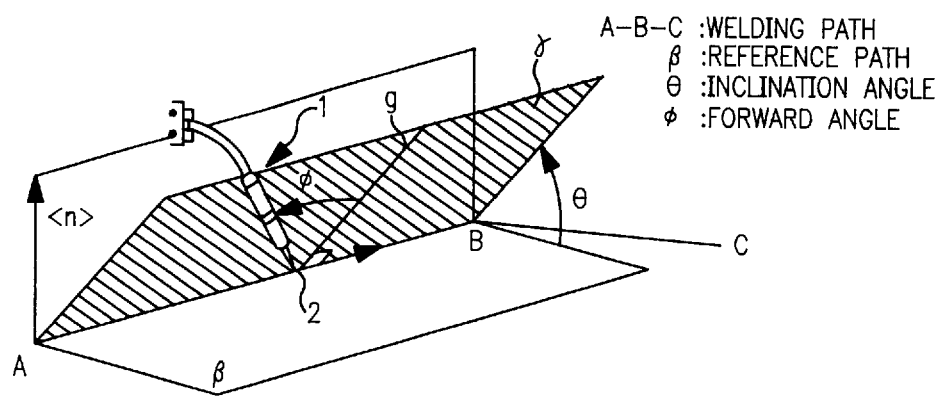
FIG. 3 is a view for explaining the orientation of a torch.

First, a reference plane, which is used as a reference for specifying an inclination angle described later, is set. FIG. 3 shows a relationship among the reference plane, the inclination angle and the forward angle, taking the path A–B as an example. A reference plane β, though set by teaching the reference plane to the robot as described later, can be replaced by a known plane such as a robot installing plane. The reference plane may be also set by inputting directly the data specifying the normal vector of the reference plane.

When assuming a plane y on which a straight line representing the direction of the torch 1 (Z-axis direction of a tool coordinate system) is placed with respect to the reference plane β, an angle between the plane γ and the reference plane β is defined as an "inclination angle θ". When standing a vertical line g to the straight line A–B representing the welding path from the tool center point 2 in a manner such that it is placed on the plane γ, an angle between the straight line representing the direction of the torch 1 (Z-axis direction of a tool coordinate system) and the straight line g is defined as a "forward-angle φ";

When the reference plane β was set, then a three dimensional rectangular coordinate system for calculating the torch orientation is set for each path by using the vector in the path direction and the normal vector of the reference plane. The torch orientation is expressed by a 3×3 matrix corresponding to the orientation expressing part of a 4×4 homogeneous transformation matrix representing the position/orientation of the tool coordinate system. The matrix is composed of three rectangular unit vectors, that is, a normal vector <N>, an orientation vector <O> and an approach vector <A>. Thus, the vector (<N> <O> <A>) representing the tool orientation is called a tool vector.

Hereafter, it is defined that "<>" represents a vector; "x" and "•" placed between vectors indicate an outer product and an inner product respectively.

Figure 4:
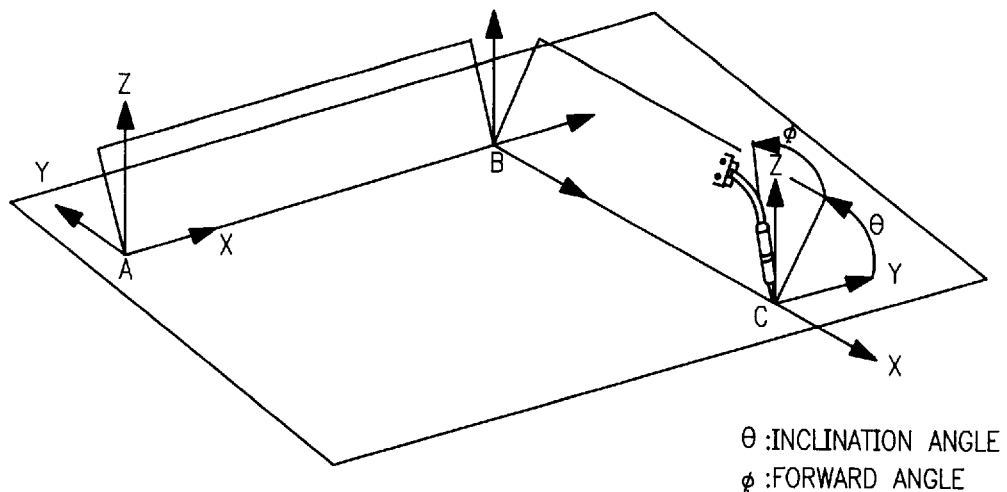
FIG. 4 is a view for explaining setting of a coordinate system and a reference plane for the sections AB, BC, and setting of a torch orientation based on the reference plane.
Figure 5:
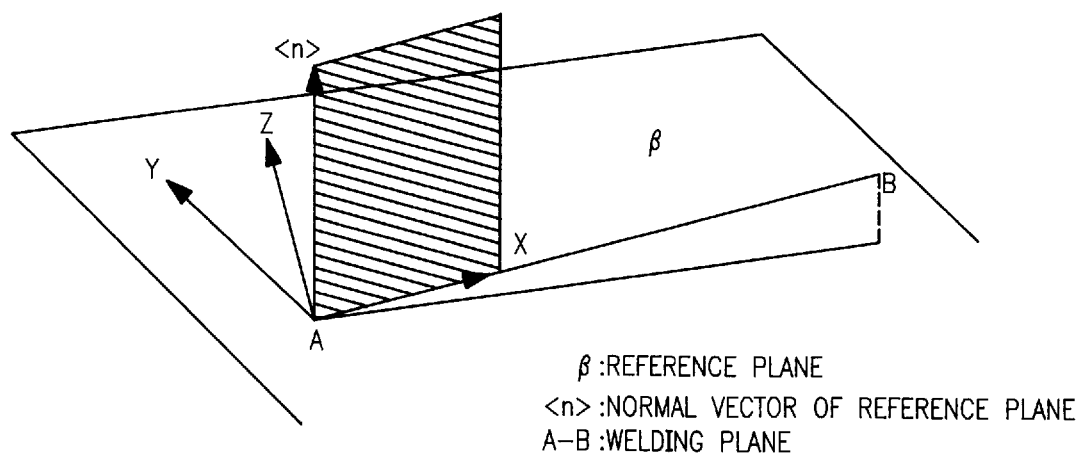
FIG. 5 is a view for explaining how to determine the coordinate system for the section AB.

FIG. 4 is a view showing how to define the coordinate system, the reference plane β, the inclination angle θ and the forward angle φ, taking the sections AB, BC as an example. In this manner, one coordinate system is made for corresponding one section (such as AB or BC). Therefore it is possible to specify a torch orientation (tool vector) with respect to the corresponding weld line by calculating the torch orientation in a manner such that the inclination angle θ and the forward angle φ specified on the coordinate system are satisfied. With reference to FIG. 5 and other figures, the embodiment of the present invention will be specifically explained hereinafter.

2. a: How to define a coordinate system for the section AB (refer to FIG. 5)

A unit vector <U> in the direction from the point A to the point B is calculated by the following equation [1], and the vector is taken as the X-axis of a coordinate system to be determined.

$$<U>=<AB>/|<AB>| \quad [1]$$

where "|< >|" represents the absolute value of the vector.

Then, the outer product <V> of a normal vector <n> of the reference plane and the unit vector <U> in the X-axial direction is calculated by the following equation [2], and the product is taken as the Y-axis of a coordinate system to be determined.

$$<V>=<n>\times<U>/|<n>\times<U>| \quad [2]$$

Finally, the outer product <W> of <U> and <V> is calculated, and the product is taken as the Z-axis of a coordinate system. As described above, from the direction of the section (A→B) and the normal vector <n> of the reference plane, the XYZ coordinate in this section can be set. Therefore, in setting a coordinate system in a section, it does not matter whether the direction of the section is within the reference plane. For example, even when the line connecting the point A and point B is not placed on the reference plane β, the X-axis is set in the direction A–B; the Y-axis, in the direction perpendicular to the X-axis and the normal line of the reference plane; and the Z-axis, in the direction perpendicular to the X-axis and the Y-axis.

Hereafter, in this manner, for each of the sections AB, BC . . . , respective coordinate system (which system is hereinafter called [UVW]) is defined, and for each section on the coordinate system [UVW], the inclination angle θ and the φ is specified.

2. b: How to calculate the torch orientation (tool vector) implementing the specified inclination angle θ and the forward angle φ on the determined coordinate system [UVW]

The matter to be paid attention when calculating the torch orientation is that, in a general robot having six degrees of freedom, the torch orientation can be unconditionally defined only by determining a spin angle (an angle representing the orientation of a rotation around the axis of the torch 1 or around the Z-axial of the tool coordinate system) in addition to the inclination angle θ and the forward angle φ.

In this embodiment, in determining the spin angel, a method is employed in which the spin angle at the above-mentioned step (1) is caused to be reflected in the torch orientation which has been transformed to the program data corresponding to FIG. 2B from the program data corresponding to FIG. 2A. This method has an advantage in that a twining of welding cable at the time of playing back operation or an interference with a work piece due to the rotation of the robot wrist around the torch is made hard to occur. The processing including the determination of the spin angel will be explained hereinafter.

2. b.1: From the orientation data at the teaching of the point A, the taught spin angle (taught_spin_ang) is determined. During determining process of the taught spin angle, although the inclination angle and the forward angle at the time of teaching are also calculated, the data thereof becomes unnecessary.

2. b.1.1: Using the equation [3], the tool vector (<N> <O> <A>) representing the tool orientation at the time of teaching is transformed to the expression [$^P$<N> $^P$<O> $^P$<A>] on the coordinate system [UVW] having been already determined for each section. In the expression, the upper left subscript$^P$ is used as a code for meaning the expression on the coordinate system [UVW].

$$[^P<N>, ^P<O>, ^P<A>]=[<U> <V> <W>]^{-1} * [<U> <V> <W>] \quad [3]$$

where []$^{-1}$ represents the inverse matrix of the matrix [].

2. b.1.2: The taught inclination angle at the time of teaching (expressed as taught_incl_ang) is calculated by the following equation [4].

$$\text{taught\_incl\_ang}=\text{atan2}\,(^PAz,^PAy) \quad [4]$$

In the equation, $^PAz,^PAy$ are components in the Z-axis and Y-axis of P<A>; and atan2 (ξ1, ξ2) is in general a function which gives an output of angle ψ from inputs of ξ1 and ξ2, in which cos (ψ)=ξ1 and sin (ψ)=ξ2 holds.

2. b.1.3: Calculation of forward angle at the time of teaching (taught_fwrd_ang)

First, the tool vector $[{}^P\!<\!N\!> {}^P\!<\!O\!> {}^P\!<\!A\!>]$ at the time of teaching is turned around $<\!U\!>$ as the X-axis of the coordinate system [UVW] by ($\pi/2$-taught_fwrd_ang) to produce a tool vector $[{}^P\!<\!N'\!> {}^P\!<\!O'\!> {}^P\!<\!A'\!>]$ representing a condition in which an approach vector (an unit vector representing the torch direction) is placed on the X–Z plane of the coordinate system [UVW]. This is determined by the following equation [6], using the next equation [5].

$$\theta 1 = (\pi/2 - \text{taught\_fwrd\_ang}) \qquad [5]$$

$$[{}^P\!<\!N'\!>{}^P\!<\!O'\!>{}^P\!<\!A'\!>] = \begin{pmatrix} 1 & 0 & 0 \\ 0 & C\theta 1 & -S\theta 1 \\ 0 & S\theta 1 & C\theta 1 \end{pmatrix} * [{}^P\!<\!N\!>{}^P\!<\!O\!>{}^P\!<\!A\!>] \qquad [6]$$

In the equation [6], C$\theta 1$ and $-S\,\theta 1$ represent sin $\theta 1$ and cos $\theta 1$, respectively (hereafter, in the same manner).

The forward angle at the time of teaching (taught_fwrd_ang) is given by the following equation [7].

$$\text{taught\_incl\_ang} = \text{atan2}({}^P\!A'x, {}^P\!A'z) \qquad [7]$$

where ${}^P\!A'x, {}^P\!A'z$ are components in the X-axis and Z-axis of ${}^P\!<\!A'\!>$.

2. b.1.4: Calculation of spin angle at the time of teaching (taught_spin_ang)

First, the previously determined tool vector $[{}^P\!<\!N'\!> {}^P\!<\!O'\!> {}^P\!<\!A'\!>]$ is rotated as the Y-axis of the coordinate system [UVW] by an angle of taught_fwrd_ang around $<\!V\!>$ to produce a tool vector $[{}^P\!<\!N''\!> {}^P\!<\!O''\!> {}^P\!<\!A''\!>]$ representing a condition in which an approach vector (an unit vector representing the torch direction) is coincident with $<\!W\!>$ which is the Z-axis of the coordinate system [UVW]. This is determined by the following equation [9], using the next equation [8].

$$\theta 2 = \text{taught\_fwrd\_ang} \qquad [8]$$

$$[{}^P\!<\!N''\!>{}^P\!<\!O''\!>{}^P\!<\!A''\!>] = \begin{pmatrix} C\theta 2 & 0 & S\theta 2 \\ 0 & 1 & 0 \\ -S\theta 2 & 0 & C\theta 2 \end{pmatrix} * [{}^P\!<\!N'\!>{}^P\!<\!O'\!>{}^P\!<\!A'\!>] \qquad [9]$$

Then, the spin angle at the time of teaching (taught_spin_ang) is determined by the following equation [10].

$$\text{taught\_spin\_ang} = \text{atan2}[{}^P\!N''y, {}^P\!N''x] \qquad [10]$$

2. b.2: From the calculated spin angle at the time of teaching expressed as (taught_spin_ang), and the inclination angle specified by inputting (expressed as incl_ang) and the forward angle (expressed as fwrd_ang), a tool vector representing the target torch orientation is calculated.

2. b.2.1: A transformation matrix is determined which represents the rotation with the same magnitude as taught_spin_ang around $<\!W\!>$ which is the Z-axis of the coordinate system [UVW]. That is, the matrix applying the rotation to the unit matrix is determined. This is determined by the following equation [12], using the next equation [11].

$$\theta 3 = \text{taught\_spin\_ang} \qquad [11]$$

$$[{}^P\!<\!n\!>{}^P\!<\!o\!>{}^P\!<\!a\!>] = \begin{pmatrix} C\theta 3 & -S\theta 3 & 0 \\ S\theta 3 & C\theta 3 & 0 \\ 0 & 0 & 1 \end{pmatrix} \qquad [12]$$

2. b.2.2: $[{}^P\!<\!n\!> {}^P\!<\!o\!> {}^P\!<\!a\!>]$ is rotated around the Y-axis ($<\!V\!>$) of the coordinate system [UVW] by —fwrd_ang. This is determined by the following equation [14], using the next equation [13].

$$\theta 4 = -\text{fwrd\_ang} \qquad [13]$$

$$[{}^P\!<\!n'\!>{}^P\!<\!o'\!>{}^P\!<\!a'\!>] = \begin{pmatrix} C\theta 4 & 0 & S\theta 4 \\ 0 & 1 & 0 \\ -S\theta 4 & 0 & C\theta 4 \end{pmatrix} * [{}^P\!<\!n\!>{}^P\!<\!o\!>{}^P\!<\!a\!>] \qquad [14]$$

2. b.2.3: $[{}^P\!<\!n'\!> {}^P\!<\!o'\!> {}^P\!<\!a'\!>]$ is rotated around the X-axis ($<\!U\!>$) of the coordinate system [UVW] by incl_ang-$\pi/2$. This is determined by the following equation [16] using the next equation [15].

$$\theta 5 = -\text{incl\_ang} - \pi/2 \qquad [15]$$

$$[{}^P\!<\!n''\!>{}^P\!<\!o''\!>{}^P\!<\!a''\!>] = \begin{pmatrix} 1 & 0 & 0 \\ 0 & C\theta 5 & 0 \\ 0 & S\theta 5 & C\theta 5 \end{pmatrix} * [{}^P\!<\!n'\!>{}^P\!<\!o'\!>{}^P\!<\!a'\!>] \qquad [16]$$

2. b.2.4: The calculated tool vector $[{}^P\!<\!n''\!> {}^P\!<\!o''\!> {}^P\!<\!a''\!>]$ is transformed to the expression $[<\!n''\!> <\!o''\!> <\!a''\!>]$ on the base coordinate system [UVW] which has been set to the robot. This is given by the following equation [17].

$$[<\!n''\!> <\!o''\!> <\!a''\!>] = [<\!U\!> <\!V\!> <\!W\!>] * [{}^P\!<\!n''\!> {}^P\!<\!o''\!> {}^P\!<\!a''\!>] \qquad [17]$$

By calculating the above calculation on the respective sections AB, BC . . . EF, a tool vector can be calculated which represents the basic welding orientation (refer to FIG. 2B) at the respective points A, B . . . E.

3. [Step (3)]

At this step, an automatic calculation is executed by software processings, which, using the program where the basic welding orientations shown in FIG. 2B are taught, produces a program which realizes a smooth transition of the torch orientation is in the subsection ranging from behind to before respective junction points by adding auxiliary points near the junction points B, C . . . E. The calculated results are stored in the nonvolatile memory 14. This provides a program which is expected to have the same quality as is taught carefully by a skilled operator in the conventional method (refer to FIG. 1).

In this embodiment, auxiliary points are added before and behind respective junction points. However, the points may be added to only front or only behind the junction points. When the position of the auxiliary points has been determined by the automatic calculation, tool vectors at the added respective auxiliary points and at the respective junction points are calculated to realize a smooth transition of the torch orientation near the junction points.

Generally, the taught orientation at the junction points B, C . . . E becomes different from the basic welding orientation at the junction points B, C . . . E shown in FIG. 2B. That is, the taught orientation is brought close to the basic welding orientation at the junction point immediately behind the present junction point. For example, the taught orientation at the junction point B is brought close to the basic welding orientation at the start point A; and the taught orientation at the junction point C is brought close to the basic welding orientation at the start point B.

The method of calculating the position of the auxiliary points to be added, and the method of calculating respective junction points and tool vectors at the respective junction points will be sequentially explained hereinafter. For the start point A and the end point F, the basic welding orientations determined for the path AB and EF are used respectively as the taught orientation.

Figure 10:
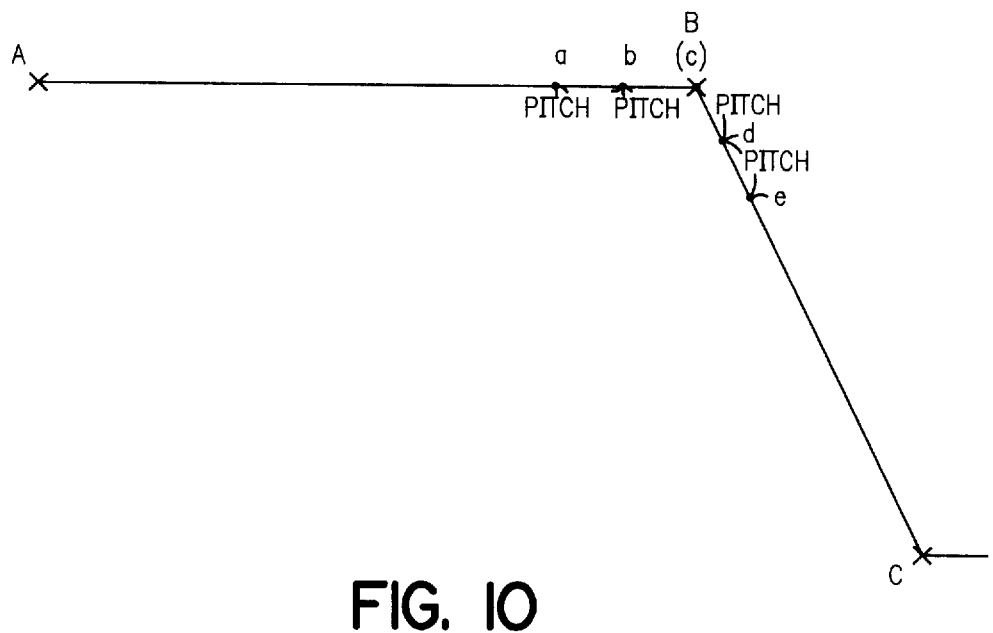
FIG. 10 is a view for explaining auxiliary points set before and behind the junction point B.

Although the number of added auxiliary points to be added may be two or more in all, including auxiliary points before and behind the junction point, according to the specification of the user, here the number is determined four including two points before and two points behind the junction point. FIG. 10 is a view for explaining how to determine the position of auxiliary points when two auxiliary points each are provided before and behind the junction point B connecting the straight-line section AB with the straight-line section BC.

A tool vector representing the orientation at the respective points a, b, c, d, e of FIG. 10 is calculated. Of those points, the points a, b, d, e are auxiliary points, while the point c is a point coincident with the junction point B. It is assumed that the distances between adjacent points are equal to each other, that is, ab=bc=cd=de (=pitch). At the points a through e, there is determined by calculation an intermediate orientation between the orientation (here a basic welding orientation determined for the point A) for the front side path A–B with respect to the junction point B and the orientation (here a basic welding orientation determined for the point B) for the rear side path B–C.

Here, it is assumed that the orientation at the auxiliary point a is made to be coincide with the basic welding orientation determined for the start point A, while the orientation at the auxiliary point e is made to be coincide with the basic welding orientation determined for the junction point B. Tool vectors at the midway auxiliary points b, c, d is determined in equally dividing relationship so that the torch orientation is smoothly changed through four small sections ab, bc, cd, de. The calculation of the position of auxiliary points and the method of specifically calculating the equal division of orientation will be explained hereinafter.

3. a: Calculation of position of auxiliary points a, b to be set on path A–B in front of junction point B The auxiliary points a, b should be defined by the following equations [18] through [20]. The meaning of codes used here is taken as follows:

n: Number of auxiliary points to be set in front of (or behind) junction point B (user set value, two in case of FIG. 10) pitch: Auxiliary point inserting interval (user set value)

<P1>: Vector representing point A

<P2>: Vector representing point B i: Auxiliary point number (i=0 for a, i=1 for b, in case of FIG. 10)

<Li>: Vector going from point B toward the i-th auxiliary point

<Pai>: Vector representing the i-th auxiliary point determined by calculation $$<Li> = \frac{<p1> - <p2>}{|<p1> - <p2>|} * pitch * (n - i) \qquad [18]$$

$$<Pai> = <p2> + <Li> \qquad [19]$$

$$= <p2> + \frac{<p1> - <p2>}{|<p1> - <p2>|} * pitch * (n - i) \qquad [20]$$

3. b: Calculation of position of auxiliary points d, e set on path B–C on the rear side of junction point B This calculation is made by the calculation similar to the above-described 3. a. Therefore, the description of the calculation equations will be omitted.

3. c: Calculation of orientation at auxiliary points

With a change in the orientation at a junction point taken as a change from an orientation 1 to an orientation 2, a method of calculating an intermediate orientation between the orientation 1 and the orientation 2 will be explained. Hereafter, codes i and n are taken as the following meanings;

n: Number of auxiliary points on path in front of junction point B (=number of auxiliary points on path on rear side of junction point) (both are user set values)

i: Auxiliary point number ($0 \leq i \leq 2n$; in case of n=2, i=0, 1, 2, 3, 4)

weld_dir_vec 1: Unit vector representing advance direction of the path in front of junction point weld_dir_vec 2: Unit vector representing advance direction of the path on rear side of junction point

[<Ns> <Os> <As>]: Tool vector corresponding to orientation 1

[<Ne> <Oe> <Ae>]: Tool vector corresponding to orientation 2

<k0>: Normal vector of plane including weld_dir_vec 1 and weld_dir_vec 2 (generally not unit vector)

t0: Angle between weld_dir_vec 1 and weld_dir_vec 2

3. c. 1: Calculation of vector <k0> and angle t0 (calculation of orientation 2')

The vector <k0> is calculated by the following equation:

$$<k0> = weld\_dir\_vec\ 1 \times weld\_dir\_vec\ 2 \qquad [21]$$

s0, a sine of an angle between a vector weld_dir_vec 1 and a vector weld_dir_vec 2, and c0, a cosine of the angle are given by the following equations [22] and [23], respectively:

$$s0 = |<k0>| \qquad [22]$$

$$c0 = weld\_dir\_vec\ 1 \cdot weld\_dir\_vec\ 2 \qquad [23]$$

Also, the angle t0 is given by the following equation [24]:

$$t0 = atan2\ (s0, c0) \qquad [24]$$

Then, a vector [<Ne'> <Oe'> <Ae'>] corresponding to the orientation 2' which is obtained by rotating the orientation 2 around the vector <k0> by an angle −t0 is calculated by the following equation [25]:

$$[<Ne'>\ <Oe'>\ <Ae'>] = Rot\ (<k0>, -t0) * [<Ne>\ <Oe>\ <Ae>] \qquad [25]$$

Generally, Rot (<V>, θ) represents a transformation matrix performing the rotation of an angle θ around the vector <V>.

However, if s0 is a very small positive number, then the following settings may be possible:

$$<k0> = (1.0\ 0.0\ 0.0) \qquad [26]$$

$$t0 = 0.0 \qquad [27]$$

$$[<Ne'>\ <Oe'>\ <Ae'>] = [<Ne>\ <Oe>\ <Ae>] \qquad [28]$$

Where the vector <V> is a unit vector, and when the following equations are set:

$$<V> = \begin{vmatrix} vx \\ vy \\ vz \end{vmatrix},$$

$$vers\theta = 1 - \cos\theta,$$

Rot (<V>, θ) is given by the following equation [29]. If <V> is not a unit vector, a unit vector is obtained by dividing respective elements of <V> by |<V>| before calculating the equation [29].

$$R(<V>, \theta) = \begin{pmatrix} vx*vx*vers\theta + \cos\theta & vy*vx*vers\theta vz*\sin\theta & vz*vx*vers\theta + vy*\sin\theta \\ vx*vy*vers\theta + vz*\sin\theta & vy*vy*vers\theta + \cos\theta & vz*vx*vers\theta + vx*\sin\theta \\ vx*vz*vers\theta vy*\sin\theta & vy*vz*vers\theta + vx*\sin\theta & vz*vz*vers\theta + \cos\theta \end{pmatrix} \quad [29]$$

3. c. 2: Calculation of <k1> and t1 (calculation of orientation 1')

The orientation 2' determined in the above paragraph,3. c. 1 corresponds to the one which is obtained by rotating the orientation 2 (so as to be brought close to the orientation 1) around the normal of a plane including the welding path before and behind a junction point. Now, as a process for further eliminating a difference between the orientation 2' and the orientation 1, a transformation will be considered in which both approach vectors are superposed on each other.

First, the approach vector of the orientation 1 is superposed on the approach vector of the orientation 2' by a shortest rotation to produce the orientation 1'. The vector acting as a rotating center at that time is taken as <k1>; and the rotational angle, as t1 ($0 \leq t1 \leq \pi$). The description of equations [30] through [34] representing <k1>, t1 and the related quantity is as follows:

<k1>=<As>×<Ae'>  [30]

s1=|<k1>|  [31]

where if s1 is a very small positive number, the following setting [32] will be also possible:

k1=<Ne'>  [32]

c1=<As>•<Ae'>  [33]

t1=atan2 (s1, c1)  [34]

where, note that atan2 is outputted (defined) even when s1=0 is inputted.

Then, the orientation 1' obtained by rotating the orientation 1 around the vector <k1> by the angle t1 is calculated. A tool vector [<Ns'> <Os'> <As'>] corresponding to the orientation 1' is given by the following [35]:

[<Ns'> <Os'> <As'>]=Rot (<k1>, t1) * [<Ns> <Os> <As>]  [35]

3. c. 3: Calculation of <k2> and t2

With respect to the direction around an approach vector, there is a deviation between the orientation 2' calculated in the above paragraphs, 3. c. 1 and 3. c. 2, and the orientation 1'. Thus, as a process for eliminating the deviation between the both, a rotational transformation for removing the deviation will be considered.

A vector acting as a rotational center is taken as <k2>; and the rotational angle, as t2 ($0 \leq t1 \leq \pi$). <k2> is an approach vector of both orientations or a vector obtained by making the approach vector reversal. The description of equations [36] through [40] representing <k2>, t2 and the related quantity are as follows:

<k2>=<Ns'>×<Ne'>  [36]

s2=|<k2>|  [37]

where if s2 is a very small positive number, the following setting [38] may be possible:

k2=<Ae'>  [38]

c2=<Ns'>•<Ne'>  [39]

t2=atan2 (s2, c2)  [40]

Note that atan2 is outputted (defined) even when s2=0 is inputted.

Now, the vectors <k2> and <Ae'> are vectors facing each other in the same or reverse direction, and whether the direction is same or reverse can be judged by the sign of the inner product of both if calculated. Thus, "save_sign" is defined as follows:

save_sign=<k2>•<Ae'>  [41]

The sign of save_sign is utilized later for judging of processing.

3. c. 4: Equal division processing

Considering the total number of auxiliary points before and behind junction points and the junction points themselves, the number h of orientations to be calculated for one junction point is given as h=2n+1 (in the example of FIG. 10, n=2, thus h=5, so that total number is five for of points a through e).

First, a vector [<N1> <O1> <A1>] corresponding to an orientation obtained by rotating the orientation 1 around the vector <k0> by t0* i/2n is determined by the following equation [42].

[<N1> <O1> <A1>]=Rot{<k0>, (t0 * i/2n)}* [<Ns> <Os> <As>]  [42]

Further, an orientation <k1'> obtained by rotating the vector <k1> around the vector <k0> by t0 * i/2n is determined by the following equation [43].

<k1'>=Rot {<k0>, (t0 * i/2n)}* <k1>  [43]

Then, [<N2> <O2> <A2>] obtained by rotating [<N1> <O1> <A1>] around <k1'> by t1 * i/2n is determined by the following equation [44].

[<N2> <O2> <A2>]=Rot{<k1'>, (t1 * i/2n)}* [<N1> <O1> <A1>]  [44]

Further, according to the sign of save_sign, <k2> is defined as follows:

For save_sign<0:<k2>=−A2  [45]

For save_sign$\geq$0: <k2>=A2  [46]

Finally, [<Ni> <Oi> <Ai>] obtained by rotating [<N2> <O2> <A2>] around <k2> by t2 * i/2n is determined by the following equation [47].

[<Ni> <Oi> <Ai>]=Rot{<k2>, (t2 * i/2n)}* [<N2> <O2> <A2>]  [47]

By performing the processing including the above-described calculation contents on individual junction points, the position of auxiliary points in the above paragraphs, 3.a and 3. b, and the orientation at the auxiliary points (and junction points) in the paragraph, 3. c are determined. Therefore, by combining them, all position data relating to respective junction points will obtained.

4. [Teaching processing]

On the basis of the above-mentioned description, the procedure and processing of the teaching method in this embodiment, mainly the operation an operator performs, will be further explained hereinafter.

[Preparation]

(1) First, for the preparation to perform the teaching of the torch orientation, the operator teaches sequentially the start point, end point and junction points on the welding path as shown in FIG. 2A by jog feed without paying any attention to the torch orientation as the data for motion program. It is preferable, during the teaching, to avoid a change of torch orientation which will induce a cable twining.

(2) Then, an operation screen of the torch orientation quick teach function is displayed on the LCD 17 of the teaching pendant 18. This is shown in FIG. 6.

[Operation/processing execution procedure]

Figure 12:
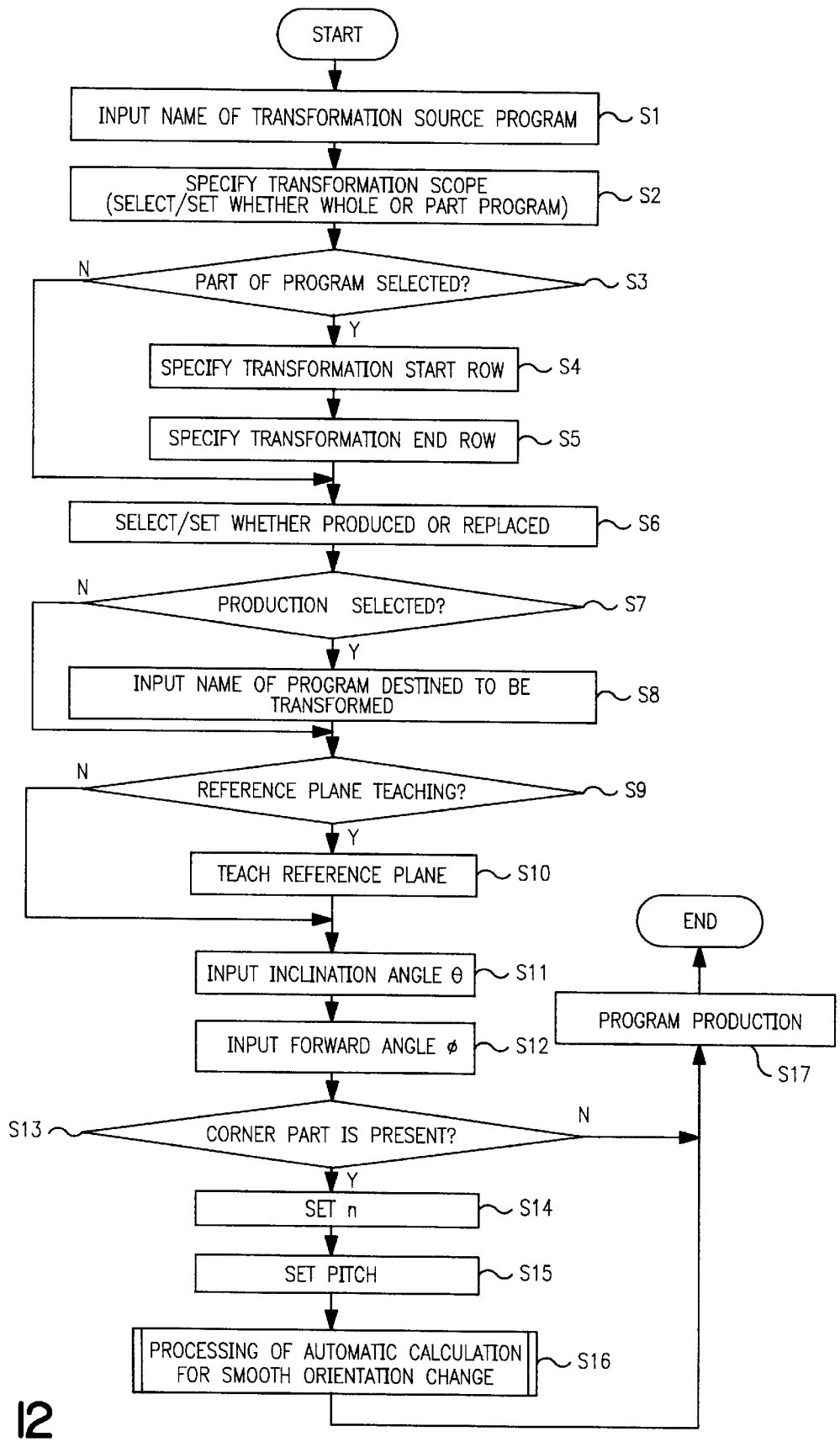
FIG. 12 is a flow chart describing the outline of an operation/processing procedure to be carried out after displaying of the operation screen of the torch orientation quick teach function.

With reference to the flow chart of FIG. 12, the outline of the operation/processing execution procedure after the operation screen of the torch orientation quick teach function is displayed will be explained.

(3) First, a program name ("TEST") of a program which becomes a transformation source and is taught in the [preparation 1] is inputted (step S1), and then a scope to be transformed is specified (steps S2 through S5). The transformation scope is specified in such a manner that either whole or part of the program be selected (step S2), and in case of part (step S3), the selected scope be specified with the row numbers (numbers of a transformation start row and transformation end row) of the program (steps S4, S5).

(4) Then, whether the transformed part is newly "produced", or "replaced" by part specified by the transformation source is set (step S6). When nothing is set at the step, "replaced" is considered to be set.

(5) When "produced" is set at the above-mentioned (4) (step S7), the program name of the program distined to be transformed is inputted (step S8), however when "replaced" is set, the operation to input the program name of the program distined to be transformed is not required.

(6) If the program name inputted in the above-mentioned (5) has been registered, the number of the row corresponding to the transformed part to be inserted is set. Where the program is an unregistered (newly produced) program, such setting is not required.

(7) Then, the page switching key is depressed to cause "Welding orientation automatic calculation screen" to be displayed on the screen of the LCD 17. This is shown in FIG. 7.

(8) On "Welding orientation automatic calculation screen", first, whether the reference plane which is a plane used for setting an inclination angle is taught or not is set by selecting "Yes" or "No". When the reference plane is not set by teaching, the plane parallel to the robot installing plane (floor plane) is considered to be set as the reference plane. The data on the reference plane is given in the form of the data on normal vectors. The direction of the reference plane is specified by the direction of the normal vector.

(9) When in the above-mentioned (8), the teaching of the reference plane is selected (step S9), the reference plane is taught (step 10). Using a teaching pendant 18, the torch head is caused to move by the jog feed operation, and the position of three points (provided that the points be selected in a condition in which they are not located on one straight line) on the reference plane desired to be set should be taught. The torch orientation at the time of teaching is optional.

(10) The inclination angle θ and the forward angle φ desired for each section should be inputted with a numerical value (steps S11, S12).

(11) To execute the processing of "Torch orientation automatic calculation", the function key "TRANSFORMATION" should be depressed. This causes the processing of "Torch orientation automatic calculation" to be started, whereby the basic welding orientation satisfying the conditions of the desired inclination angle θ and the forward angle φ is calculated for each section (refer to FIG. 2B).

Now, let corner part be a part where in which a straight-line section with a length more than a predetermined value crosses at a junction point with another straight-line section with a length more than a predetermined value, for example, a part in which on the weld line of FIG. 2B, the straight-line section B–C crosses at the connection point C with the straight-line section C–D. If the weld line has no corner part (step S13), this means that there is no junction point for which "Calculation for smooth orientation change" must be executed, or the welded line, so that the welding program will be completed at this step.

Figure 11:
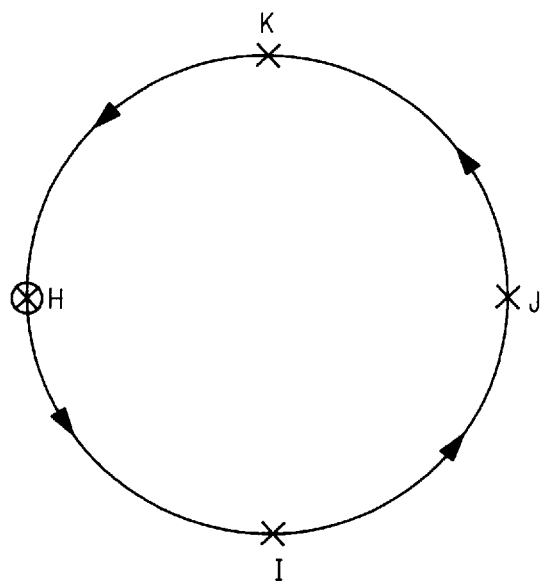
FIG. 11 is a view showing a circumference-shaped welding path connecting two semicircle sections.

For example, this applies to a case where two semicircle paths (HIJ and JKH) are connected into a circle to weld the circumference, as shown in FIG. 11. In such a case, the X-axis direction of the coordinate system [UVW] set on each of points H through K is specified at the tangent line direction at each of the points H through K on the circler arc path, so that the basic welding orientation at the points H through K is calculated by the above-mentioned calculation process.

(12) On the contrary, when the weld line has a corner part, the page switching key should be further depressed to cause the execution screen of "Automatic calculation for smooth orientation change" to be displayed. This is shown in FIG. 8.

(13) In this screen, first, the number n of auxiliary points to be inserted into positions before and behind a junction point forming the corner part is set (step S14). FIG. 10 shows an example in which n=2 is set.

(14) Then, the inserting interval (the above-mentioned "pitch") of auxiliary points should be inputted with a numerical value (step 15).

(15) Finally, depressing the function key "EXECUTION" of the teaching pendant 18 causes the processing of the automatic calculation for smooth orientation change to be executed (step 16). Here, for junction points forming the corner part in the path programmed within the scope specified by the program (TEST), the position of auxiliary points is calculated under the above-mentioned set condition (n, pitch), and then, a welding program for realizing a smooth torch orientation change (transition) is automatically produced (step S17).

What is claimed is:

1. A method for teaching a welding torch orientation for executing an arc welding by a welding torch supported by a robot, said method including the steps of:

transferring existing position data indicating a start point, an end point and junction points between sections on a weld line to the robot controller;

for each section inputting a forward angle which is an inclined angle of the welding torch with reference to a direction of the section;

obtaining a reference plane by teaching, or selecting any one of planes previously stored in a robot controller as a reference plane, and then inputting for each section, an inclination angle which is an inclined angle of the welding torch with respect to the reference plane;

calculating, in software, a desired torch orientation for the length of each section based on the data on the respective points transferred to said robot controller, and said inputted inclination angle and said forward angle;

setting auxiliary points in the periphery of the junction point, for each junction point that connects a straight-line section with another straight line section; and allocating the torch orientation, in software, for each of the set auxiliary points and junction points according to the arrangement of the points, so that the torch orientation is changed gradually from said desired torch orientation in the section after the junction point to said desired torch orientation in the section before the junction point.

2. A method for teaching a welding torch orientation for executing the arc welding by a welding torch supported by a robot, said method including the steps of:

teaching the position of a start point, an end point and junction points between sections on a weld line by a robot jog feed operation without imposing a specific condition on the torch orientation;

for each section inputting a forward angle which is an inclined angle of the welding torch to the direction of the section;

obtaining a reference plane by teaching, or selecting any one of planes previously stored in a robot controller as a reference plane, and then inputting, for each section, an inclination angle which is an inclined angle of the welding torch with respect to the reference plane;

calculating a desired torch orientation, in software, for each section on the basis of the taught data on the respective points, and said inputting inclination angle and said forward angle;

setting auxiliary points in the periphery of a junction point for each junction point that connects a straight-line section with another straight-line section; and allocating the torch orientation for each of the set auxiliary points and junction points in software, according to the arrangement of the points, so that the torch orientation is changed gradually from said desired torch orientation in the section after the junction point to said desired torch orientation in the section before the junction point.

3. A method for teaching a welding torch orientation as set forth in claim 2, wherein during the calculation of said basic welding orientation, the state at the time of teaching by said jog feed operation is further reflected for the orientation around a torch axis.

4. A method of teaching a welding torch orientation as set forth in claim 1, wherein said reference plane is defined by teaching a required plane to said robot.

5. A method of teaching a weld torch orientation for executing the arc welding by a welding torch supported by a robot, said method comprising the steps of:

(a) teaching position data indicating a start point of a weld line, an end point of the weld line and connection points dividing the weld line into a plurality of straight-line sections;

(b) obtaining a reference plane by teaching or selecting any one of planes already stored in a robot controller;

(c) defining a three-axis rectangular coordinate system for each straight-line section based on a direction of a straight-line section and a normal direction of the reference plane taught or selected in step (b);

(d) transforming a tool vector composed of a set of three rectangular unit vectors, including a torch direction unit vector, to an expression in the three-axis rectangular coordinate system defined in step (c);

(e) calculating a taught inclination angle and a taught forward angle from the tool vector expressed in the three-axis rectangular coordinate system, the inclination angle being defined as an angle of the welding torch with respect to the plane, and the forward angle as an angle of the welding torch with respect to the direction of the section, and then, on the basis of these angles, determining a taught spin angle as a taught orientation with the torch direction taken as an axis;

(f) calculating the tool vector expressed in the three-step rectangular coordinate system determined in step (c), from the taught spin angle obtained in step (e), a forward angle specified by input, and an inclination angle specified by input;

(g) obtaining a basic welding orientation for said straight-line section, by transforming the calculated tool vector obtained in step (f) to an expression in the base coordinate system;

(h) setting at least one auxiliary point spaced apart by a predetermined distance in the straight-line section at least one of before and after a junction point, with the junction point as a reference;

(i) specifying the basic welding orientation for the straight-line section defined in step (g) to an auxiliary point at the position most apart from the junction point in the forward/rearward straight-line section, among auxiliary points set in step (h); and (j) allocating the torch orientation for any remaining auxiliary points and said junction points according to the arrangement of the points, so that the torch orientation is changed gradually from the basic torch orientation for one straight-line section defined in step (g) to the basic torch orientation for the next straight-line section.

6. A method of teaching a welding torch orientation as set forth in claim 2, wherein said reference plane is defined by teaching a required plane to said robot.

7. A method of teaching a welding torch orientation as set forth in claim 3, wherein said reference plane is defined by teaching a required plane to said robot.

* * * * *